United States Patent
Elgarisi

(10) Patent No.: US 9,467,371 B2
(45) Date of Patent: Oct. 11, 2016

(54) WLAN HOME NETWORKING WITH MULTI-ROOM DVR DIRECT LINK

(75) Inventor: Yaniv Elgarisi, Givat Shmuel (IL)

(73) Assignee: CELENO COMMUNICATIONS (ISRAEL) LTD., Ra'anana (IL)

(*) Notice: Subject to any disclaimer, the term of this patent is extended or adjusted under 35 U.S.C. 154(b) by 186 days.

(21) Appl. No.: 14/232,289

(22) PCT Filed: Jun. 21, 2012

(86) PCT No.: PCT/IB2012/053137
§ 371 (c)(1),
(2), (4) Date: Mar. 9, 2014

(87) PCT Pub. No.: WO2013/008114
PCT Pub. Date: Jan. 17, 2013

(65) Prior Publication Data
US 2014/0286328 A1   Sep. 25, 2014

Related U.S. Application Data

(60) Provisional application No. 61/507,506, filed on Jul. 13, 2011.

(51) Int. Cl.
| | |
|---|---|
| H04W 8/26 | (2009.01) |
| H04L 12/741 | (2013.01) |
| H04L 12/46 | (2006.01) |
| H04W 28/06 | (2009.01) |
| H04W 84/12 | (2009.01) |

(52) U.S. Cl.
CPC .......... *H04L 45/74* (2013.01); *H04L 12/4625* (2013.01); *H04W 28/06* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 6,640,251 B1 | 10/2003 | Wiget et al. | |
| 7,386,605 B2* | 6/2008 | Shah | H04L 12/4641 370/401 |
| 8,627,447 B1* | 1/2014 | Chickering | H04L 63/0263 726/11 |
| 9,100,213 B1* | 8/2015 | Ramanathan | H04L 12/413 |
| 2002/0156612 A1* | 10/2002 | Schulter | H04L 12/28 703/23 |
| 2005/0018624 A1 | 1/2005 | Meier et al. | |

(Continued)

OTHER PUBLICATIONS

European Application # 12811158.0 Search Report dated Mar. 16, 2015.

(Continued)

*Primary Examiner* — Omar Ghowrwal
*Assistant Examiner* — Angel Brockman
(74) *Attorney, Agent, or Firm* — D. Kligler IP Services Ltd.

(57) ABSTRACT

A method includes operating a communication system (20) that includes a wireless access point (AP—24) and multiple wireless stations (STAs—28), including at least a first STA that is connected to a first endpoint (36) and a second STA that is connected to a second endpoint (36). A communication packet is transferred from the first endpoint to the second endpoint by transmitting the packet from the first STA to the second STA, not via the AP, using an addressing scheme that specifies in the packet respective layer-2 addresses of the first and second STAs but not of the first and second endpoints. In the second STA, the layer-2 address of the second endpoint is resolved, the resolved layer-2 address is inserted into the packet and the packet is forwarded to the second endpoint using the inserted layer-2 address.

28 Claims, 1 Drawing Sheet

(56) References Cited

U.S. PATENT DOCUMENTS

| | | | | |
|---|---|---|---|---|
| 2005/0174962 A1* | 8/2005 | Gurevich | ............. | H04W 88/06 370/328 |
| 2010/0246502 A1* | 9/2010 | Gong | ................. | H04L 12/6418 370/329 |
| 2013/0229969 A1* | 9/2013 | Quan | ................... | H04L 12/189 370/312 |

OTHER PUBLICATIONS

CISCO: "Proxy ARP Introduction Prerequisites Requirements Components Used Conventions How Does Proxy ARP Work? Network Diagram Advantages of Proxy ARP Disadvantages of Proxy ARP Related Information", Document ID 13718, 4 pages, Jan. 28, 2008.

Darwin Engwer Nortel: "IEEE, P802.11-05/0710r0, Wireless LAN", 9 pages, Jul. 1, 2005.

PCT Application # PCT/IB2012/053137 International Search Report dated Oct. 18, 2012.

IEEE 802.11, "IEEE Standard for Information technology—Telecommunications and information exchange between systems—Local and metropolitan area networks—Specific requirements Part 11: Wireless LAN Medium Access Control (MAC)and Physical Layer (PHY) Specifications" , pp. 1-1184, Jun. 12, 2007.

Plummer, D.C., "An Ethernet Address Resolution Protocol or Converting Network Protocol Addresses to 48.bit Ethernet Address for Transmission on Ethernet Hardware", Network Working Group, RFC 826, 10 pages, Nov. 1982.

\* cited by examiner

WLAN HOME NETWORKING WITH MULTI-ROOM DVR DIRECT LINK

CROSS-REFERENCE TO RELATED APPLICATIONS

This application claims the benefit of U.S. Provisional Patent Application 61/507,506, filed Jul. 13, 2011, whose disclosure is incorporated herein by reference.

FIELD OF THE INVENTION

The present invention relates generally to wireless communication, and particularly to methods and systems for communication between stations in a wireless local area network.

BACKGROUND OF THE INVENTION

Various communication systems, such as some home networking systems, are based on Wireless Local Area Network (WLAN) infrastructure. Some WLANs operate in accordance with the IEEE 802.11 standard, entitled "IEEE Standard for Information Technology—Telecommunications and Information Exchange between Systems—Local and Metropolitan Area Networks—Specific Requirements; Part 11: Wireless LAN Medium Access Control (MAC) and Physical Layer (PHY) Specifications," June, 2007, which is incorporated herein by reference.

SUMMARY OF THE INVENTION

An embodiment of the present invention that is described herein provides a method that includes operating a communication system. The system includes a wireless access point (AP) and multiple wireless stations (STAs), including at least a first STA that is connected to a first endpoint and a second STA that is connected to a second endpoint. A communication packet is transferred from the first endpoint to the second endpoint by transmitting the packet from the first STA to the second STA, not via the AP, using an addressing scheme that specifies in the packet respective layer-2 addresses of the first and second STAs but not of the first and second endpoints. In the second STA, the layer-2 address of the second endpoint is resolved, the resolved layer-2 address is inserted into the packet and the packet is forwarded to the second endpoint using the inserted layer-2 address.

In some embodiments, operating the communication system includes operating the AP and the STAs in accordance with a Wireless Local Area Network (WLAN) protocol, and the layer-2 addresses include Medium Access Control (MAC) addresses. In some embodiments, the addressing scheme includes a Direct Link Setup (DLS) or Tunneled DLS (TDLS) addressing mode defined in the WLAN protocol.

In some embodiments, the AP is connected to an AP-side endpoint, and the method includes exchanging packets between the AP-side endpoint and a given endpoint that is connected to a given STA, using a four-address addressing scheme that specifies in the packets the layer-2 addresses of the AP-side endpoint, the AP, the given STA and the given endpoint. In an embodiment, the four-address addressing scheme includes a Wireless Distribution System (WDS) addressing mode defined in a Wireless Local Area Network (WLAN) protocol used for communication among the AP and the STAs.

In a disclosed embodiment, resolving the layer-2 address of the second endpoint includes causing the first endpoint to address the packet to a layer-3 address of the second endpoint and to a layer-2 address of the second STA, and, upon receiving the packet in the second STA, replacing the layer-2 address of the second STA with the layer-2 address of the second endpoint.

In an example embodiment, causing the first endpoint to address the packet to the layer-3 address of the second endpoint and to the layer-2 address of the second STA includes receiving in the first STA an address resolution packet from the second endpoint, in which the second endpoint requests the layer-3 address of the first endpoint, and, in the first STA, replacing the layer-2 address of the second endpoint in the received address resolution packet with the layer-2 address of the second STA, and forwarding the address resolution packet to the first endpoint.

The method may include, upon receiving in the second STA a response from the first endpoint to the address resolution packet, replacing the layer-2 address of the second STA in the response with the layer-2 address of the second endpoint, and forwarding the response to the second endpoint. In another embodiment, the method includes, upon receiving in the second STA a broadcast packet from the first endpoint, replacing a layer-2 source address of the first endpoint in the broadcast packet with the layer-2 source address of the first STA before forwarding the broadcast packet to the second endpoint.

In yet another embodiment, resolving the layer-2 address of the second endpoint includes holding in the second STA layer-2 topology data, which indicates the layer-2 address of the first endpoint and that the first endpoint is connected to the first STA, and resolving the layer-2 address of the second endpoint using the layer-2 topology data. In an embodiment, the method includes receiving the topology data from the AP.

In still another embodiment, resolving the layer-2 address of the second endpoint includes holding in the second STA layer-3 mapping data, which indicates layer-3 addresses and corresponding layer-2 addresses of respective endpoints that are connected to the second STA, and resolving the layer-2 address of the second endpoint using the layer-3 mapping data. The method may include learning the layer-3 mapping data in the second STA by analyzing communication packets sent from the endpoints that are connected to the second STA.

There is additionally provided, in accordance with an embodiment of the present invention, a communication system that includes multiple wireless stations (STAs), including at least a first STA that is connected to a first endpoint and a second STA that is connected to a second endpoint. The first STA is configured to transfer a communication packet from the first endpoint to the second endpoint by transmitting the packet to the second STA, not via an Access Point (AP), using an addressing scheme that specifies in the packet respective layer-2 addresses of the first and second STAs but not of the first and second endpoints. The second STA is configured to resolve the layer-2 address of the second endpoint, to insert the resolved layer-2 address into the packet and to forward the packet to the second endpoint using the inserted layer-2 address.

The present invention will be more fully understood from the following detailed description of the embodiments thereof, taken together with the drawings in which:

DETAILED DESCRIPTION OF EMBODIMENTS

Overview

Figure 1:
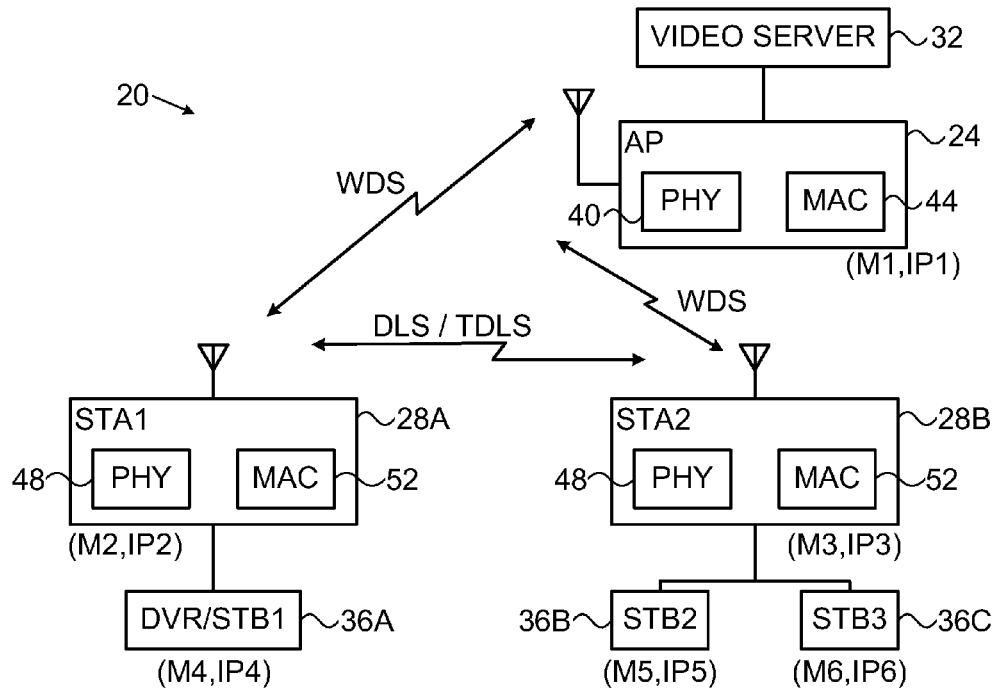
FIG. 1 is a block diagram that schematically illustrates a WLAN-based home networking system, in accordance with an embodiment of the present invention.

A WLAN typically comprise a wireless Access Point (AP) and multiple wireless stations (STAs). Each STA is connected to one or more endpoints, and the endpoints exchange communication packets via the STAs. In some WLAN-based systems the STAs may communicate with one another directly rather than via the AP. Consider, for example, a home video network in which a Set-Top Box (STB) communicates through one STA and a Digital Video Recorder (DVR) which communicates through another STA. The DVR may transmit a video stream for display at the STB over a stream of packets that is sent directly between the STAs.

The IEEE 802.11 standard enables several addressing schemes that can be used for exchanging packets. Some addressing schemes are four-address schemes that specify in each packet the layer-2 addresses of the source endpoint, the STA that serves the source endpoint, the destination endpoint and the STA that serves the destination endpoint. One example of a four-address scheme is the Wireless Distribution System (WDS) mode. Other addressing schemes are two-address schemes that specify only the layer-2 addresses of the STAs but not of the source and destination endpoints. Examples of two-address schemes are the Direct Link Setup (DLS) and Tunneled DLS (TDLS) modes.

When using DLS or TDLS for STA-to-STA communication, the layer-2 addresses (in this case Medium Access Control—MAC addresses) of the end-to-end endpoints are lost, and the system may encounter ambiguities or conflicts when attempting to resolve the end-to-end addresses. For example, an undesirable situation may arise where a given layer-3 address is associated with more than a single layer-2 address. On the other hand, DLS and TDLS are the recommended practice for peer-to-peer communication and are endorsed by the Wi-Fi Alliance. It is therefore advantageous to use the two-address modes for communication between STAs.

Embodiments of the present invention that are described herein provide improved packet processing techniques. The disclosed techniques enable using modes such as DLS or TDLS for direct STA-to-STA communication, while at the same time resolving the ambiguities and conflicts caused by the two-address addressing of these modes. The embodiments described herein refer mainly to home video distribution and communication with STBs, but the disclosed techniques can also be used for various other applications.

Typically, communication between the STAs and the APs in the disclosed embodiments is performed using four-address schemes such as using WDS, while direct STA-to-STA communication is performed using two-address schemes such as DLS or TDLS. In some embodiments, each STA holds two data structures:

A MAC topology table that indicates the layer-2 address (in the present example MAC address) of each STB in the system, and the layer-2 address of the STA via which each STB in the system is reachable.

An IP mapping table indicating the endpoint layer-3 addresses (in the present example IP addresses) that are connected to the given STA and their respective layer-2 addresses.

Using these two tables, the STAs are able to resolve the correct layer-2 addresses of the end-to-end STBs, even though these addresses are not transmitted over the air. In the embodiments described herein, the STAs apply a process that is referred to herein as receive-side MAC cloning. In some embodiments, a source STB is led to associate the layer-3 address of a destination endpoint with the layer-2 address of the destination STA that serves the destination endpoint (instead of associating the layer-2 and layer-3 addresses of the destination endpoint). Thus, when the source endpoint sends a packet to the destination endpoint, it will address the packet to the correct layer-3 address of the destination endpoint, but to the layer-2 address of the destination STA.

Upon receiving the packet, the destination STA extracts the layer-3 address of the destination endpoint, finds the layer-2 address that genuinely corresponds to this layer-3 address using the IP mapping table, replaces the closed layer-2 address with the genuine layer-2 address, and forwards the packet to the destination endpoint. One possible way of leading the source endpoint to associate the layer-3 address of a destination endpoint with the layer-2 address of the destination STA is to apply receive-side MAC cloning to address resolution packets that are sent by the endpoints in order to learn the layer-3 addresses of one another.

The receive-side MAC cloning processes applied to address resolution packets and to normal communication packets are described in details hereinbelow. Example techniques for obtaining the MAC topology table and the IP mapping table at the STAs are also described.

The disclosed techniques enable using two-address addressing modes such as DLS or TDLS for STA-to-STA communication, while avoiding the possible IP ambiguities and conflicts caused by these modes. Since the MAC cloning process is applied on the receive side, it does not affect other network activity and other system elements.

System Description

FIG. 1 is a block diagram that schematically illustrates a communication system 20, in accordance with an embodiment of the present invention. In the present example, system 20 comprises an Internet Protocol Television (IPTV) home networking system based on a Wireless Local Area Network (WLAN), which is used for video distribution to multiple Set-Top Boxes (STBs). In alternative embodiments, system 20 may comprise any other suitable communication network, serving any suitable application, in which endpoints communicate with one another over a WLAN. In an embodiment, system 20 operates in accordance with the IEEE 802.11 standard, cited above.

In the present example, system 20 comprises an Access Point (AP) 24 and two stations (STAs) 28A and 28B, respectively denoted STA1 and STA2. AP 24 is connected by a WAN broadband link (e.g., ADSL) to a video server 32. STA1 is connected to a STB 36A denoted STB1. This STB also has the functionality of a Digital Video Recorder (DVR), and can be used as a video source for other STBs in the system. STA2 is connected to two STBs 36B and 36C, respectively denoted STB2 and STB3. The STBs are in turn connected to video displays (not shown) for displaying video obtained from video server 32 or from the DVR in STB1. AP 24 may comprise Home Gateway (HGW) functionality for connecting to the video server.

The present patent application refers to WLAN nodes (AP or STA) that are connected to endpoints (e.g., STB or video server). In the context of the present patent application and in the claims, phrases such as "STA X is connected to STB Y" means that STB Y is served in the WLAN by STA X, that STA X communicates with STB Y over a link that is external to the WLAN (often a wired link but not necessarily), and that STB Y is reachable over the WLAN via STA X.

AP 24 comprises a physical-layer (PHY) unit 40 that carries out the physical-layer functions of the AP, and a Medium Access Control (MAC) unit 44 that carries out the MAC protocol functions of the AP. Each STA comprises a respective PHY unit 48 that carries out the PHY functions of the STA, and a respective MAC unit 52 that carries out the MAC functions of the STA. In the present example, the various MAC and PHY units operate in accordance with the MAC and PHY specifications of the IEEE 802.11 standard, cited above.

STBs 36A . . . 36C and video server 32 are referred to herein as endpoints that communicate with one another by exchanging packets via the STAs and AP. Each endpoint is assigned a respective layer-3 address and a respective layer-2 address, in accordance with the OSI model, and these addresses are used in exchanging the packets. In the present example, the layer-3 addresses comprise Internet Protocol (IP) addresses and the layer-2 addresses comprise Medium Access Control (MAC) addresses (also referred to as IEEE 802.3 addresses). In alternative embodiments, other kinds of layer-3 and layer-2 addresses can be used.

In the configuration of FIG. 1, the following notation is used to denote the IP and MAC addresses of the various system elements:

| System element | MAC address | IP address |
|---|---|---|
| AP | M1 | IP1 |
| STA1 | M2 | IP2 |
| STA2 | M3 | IP3 |
| STB1/DVR | M4 | IP4 |
| STB2 | M5 | IP5 |
| STB3 | M6 | IP6 |

Some of the communication in system 20, such as transmission of video from the video server to the STBs, involves communication between the AP and the STAs. Other communication, such as transmission of video from the DVR (STB1) to STB2 or STB3, involves direct peer-to-peer communication among the STAs not via AP 24, as will be explained in detail below.

The system configuration shown in FIG. 1 is an example configuration, which is chosen purely for the sake of conceptual clarity. In alternative embodiments, any other suitable system configuration can be used. For example, system 20 may comprise any desired number of STAs, and each STA may be connected to any desired number of STBs and/or video sources.

Certain elements of AP 24 and STAs 36A . . . 36B may be implemented using hardware, such as using one or more Application-Specific Integrated Circuits (ASICs) or Field-Programmable Gate Arrays (FPGAs). Alternatively, some AP and STA elements may be implemented in software or using a combination of hardware and software elements.

In some embodiments, certain AP or STA functions may be implemented using a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

WLAN Addressing Mechanisms and Modes

The IEEE 802.11 standard, cited above, provides several addressing mechanisms that can be used for specifying source and destination MAC addresses in packets. See, for example, section 7.2.2 and table 7-7 of the standard. Generally, the standard IEEE 802.11 frame format enables the packet to include up to four MAC addresses.

Various addressing modes can be defined using the standardized frame format. For example, an addressing mode known as Wireless Distribution System (WDS) uses all four address fields to specify the MAC addresses of the end-to-end source and destination endpoints (e.g., STBs or video server, often outside the WLAN) and of the source and destination wireless nodes (e.g., STA and AP) of a packet. When using this four-address mode, it is possible to resolve the IP addresses of any endpoint using the packet header alone.

Other addressing modes use only two of the four address fields. Example two-address modes are the Direct Link Setup (DLS) and Tunneled DLS (TDLS) modes. When using a two-address mode, the packet must specify only the MAC addresses of the wireless nodes (e.g., STAs) but not of the end-to-end endpoints (e.g., STBs). When using these modes, it may be impossible to unambiguously resolve the IP addresses of endpoints, because the MAC addresses of the endpoints are lost.

On the other hand, the DLS and TDLS modes provide standard infrastructure for security for direct STA-to-STA communication, and it is therefore advantageous to use them for communication between STAs.

Address Resolution in Two-Address STA-to-STA Communication

Embodiments of the present invention provide improved packet processing techniques, which enable system 20 to use modes such as DLS or TDLS for STA-to-STA communication, while at the same time resolving the ambiguities and conflicts caused by the two-address addressing of these modes. Unless noted otherwise, the disclosed techniques are carried out by MAC modules 52 of the various STAs. In other words, references to a given STA as performing a certain action on a packet means that the action is performed by the MAC module of that STA. The PHY modules of the STAs are typically responsible for transmitting and receiving the packets over the wireless medium.

Typically, communication between the AP and the STAs in system 20 is performed using four-address WDS. Direct communication between STAs (not via the AP, e.g., video transfer from the DVR to STB2 or STB3) is performed using DLS or TDLS, with the "To DS" and "From DS" fields both equal to zero according to the IEEE 802.11 addressing. In this mode, only the MAC addresses of the immediate source and destination (i.e., the transmitting and receiving STAs) are sent over the air, but not the MAC addresses of the end-to-end endpoints. Nevertheless, the destination STA is able to resolve the IP address of the destination endpoint without ambiguity or conflict, and thus forward each received packet correctly to its intended destination endpoint.

In some embodiments, each given STA holds two data structures:

A MAC topology table that indicates the MAC address of each STB in the system, and the STA MAC address via which each STB in the system is reachable.

An IP mapping table indicating the endpoint IP addresses that are connected by other links to the given STA and their respective MAC addresses.

These two tables enable a destination STA that receives a packet to resolve the IP address of the destination endpoint, even though the packet carries only the MAC addresses of the source and destination STAs.

In some embodiments, AP 24 learns the MAC topology of system 20 (i.e., the MAC addresses of the various STBs, and the STA via which each STB is reachable) and distributes the MAC topology to the STAs. The AP may distribute the MAC topology to all STAs or to a subset of the STAs (e.g., the STAs that are expected to carry out direct STA-to-STA communication). The STAs store a MAC topology table with the MAC topology information provided by the AP.

In an example embodiment, the AP learns the MAC topology by inspecting uplink packets from the STBs. Typically, when an STB initializes it attempts to communicate with video server 32, for example in order to be assigned an IP address using Dynamic Host Configuration Protocol (DHCP). In some embodiments these uplink packets are transmitted to the AP using WDS from the STA that serves the STB. Since the WDS packet specifies the MAC addresses of both the STB and the STA, the AP is able to extract the MAC addresses from the packet and learn that the extracted STB MAC address is reachable via the extracted STA MAC address. The AP may learn the MAC topology of the entire system in this manner.

In alternative embodiments, AP 24 may learn the MAC topology of system 20 in any other suitable way, not necessarily involving inspection of uplink traffic. For example, the AP may be pre-configured or otherwise provided with the MAC topology information by a network administrator or other external source.

In the example of FIG. 1, STA1 receives from the AP two MAC address pairs: (M5,M3) for STB 2, and (M6,M3) for STB3. STA1 is now informed that STB2 and STB3, having respective MAC addresses M5 and M6, are both connected to (and thus reachable via) STA2 having MAC address M3. STA2 receives from the AP the MAC address pair (M4,M2), which indicates that STB1 having MAC address M4 is reachable via STA2 having MAC address M2.

In addition to the MAC topology table, each STA typically learns and constructs an IP mapping table that indicates the endpoint IP addresses that are connected to (and thus reachable via) the STA and their respective MAC addresses. The STA may learn this information by performing Deep Packet Inspection (DPI) on uplink packets arriving from the STBs.

Using the MAC topology and IP mapping tables, the STAs are able to resolve IP addresses from a DLS/TDLS link using a technique that is referred to herein as "MAC cloning." The technique will first be described for Address Resolution Protocol (ARP) exchange, and then for normal communication. The following description demonstrates the process for communication between the DVR (STB1) and STB2. The disclosed technique can be used, however, for communication between any other pair of STAs.

Typically, STB2 is aware of the IP address of the DVR but needs to discover its MAC address in order to communicate with it. STB2 may use ARP to discover the DVR MAC address. ARP is specified by the Internet Engineering Task Force (IETF), in "An Ethernet Address Resolution Protocol, or Converting Network Protocol Addresses to 48.bit Ethernet Address for Transmission on Ethernet Hardware," Internet Standard STD 37, November, 1982, which is incorporated herein by reference.

In a conventional ARP exchange, a broadcast ARP request comprises the MAC and IP address of the requesting source endpoint, and the IP address of the requested destination endpoint. When the requested destination endpoint receives the broadcast ARP request, it responds with a unicast ARP reply to the requesting source endpoint. The ARP reply comprises the MAC and IP addresses of both the requesting source endpoint and the requested destination endpoint. Typically, both endpoints of a link initiate separate ARP exchanges in opposite directions.

Now consider a scenario in which STB1 (the DVR) needs to discover the MAC address of STB2. STB1 sends a broadcast ARP request having the following format:

| 802.3 (layer-2) header | DA MAC | BCAST |
|---|---|---|
| | SA MAC | M4 |
| ARP (layer-3) payload | Target MAC | 00 |
| | Target IP | IP5 |
| | Source MAC | M4 |
| | Source IP | IP4 |

As can be seen in the table above, the MAC destination address (DA MAC) is BCAST—indicating that this is a broadcast packet. The target IP address IP5 of STB2 is known and specified in the request. The unknown target MAC address corresponding to IP5 is set to '00'. The source MAC and IP addresses are those of STB1 (M4,IP4). AP 24 receives the ARP request and forwards it to the various STAs over the wireless interface, and also over its backbone. In particular, the ARP request is received by STA2.

Before forwarding the ARP request to STB2, STA2 modifies the source MAC address in the ARP request to indicate the MAC address of the source STA (STA1) instead of the MAC address of the end-to-end source endpoint (STB1). This operation is referred to herein as receive-side MAC cloning. STA2 has the necessary information to perform this modification from the MAC topology table. STA2 modifies the source MAC address both in the layer-2 header and in the layer-3 payload of the ARP request.

In general, as will be explained below, the receiving STA typically carries out MAC cloning by performing Deep Packet Inspection (DPI) so as to extract MAC addresses that are located behind other STAs, using the MAC topology table. The modified ARP request provided by STA2 to STB2 thus has the following format:

| 802.3 (layer-2) header | DA MAC | BCAST |
|---|---|---|
| | SA MAC | M2 (instead of M4) |
| ARP (layer-3) payload | Target MAC | 00 |
| | Target IP | IP5 |
| | Source MAC | M2 (instead of M4) |
| | Source IP | IP4 |

This modified ARP request fools STB2 to associate (IP4, M2) as an IP/MAC address pair. Therefore, STB2 will respond to the ARP request with the following ARP reply:

| 802.3 (layer-2) header | DA MAC | M2 |
| ARP (layer-3) payload | SA MAC | M5 |
| | Target MAC | M2 |
| | Target IP | IP4 |
| | Source MAC | M5 |
| | Source IP | IP5 |

Upon receiving the ARP reply, STA1 inspects the packet content in layer 3 to obtain the destination IP address, and checks whether this IP address matches an IP address of an endpoint that is connected to STA1. STA1 uses the IP mapping table for this purpose. In the present example, STA1 will extract IP4 as the destination IP address, and restores the MAC address M4 (instead of the cloned M2).

In addition, STA1 also modifies the source MAC address from that of STB2 (M5) to that of STA2 (M3). In fact, STA1 performs receive-side MAC cloning in a similar manner to the cloning operation performed by STA2 on the ARP Request. The modified ARP reply provided from STA1 to STB1 thus has the following format:

| 802.3 (layer-2) header | DA MAC | M4 |
| ARP (layer-3) payload | SA MAC | M3 |
| | Target MAC | M4 |
| | Target IP | IP4 |
| | Source MAC | M3 |
| | Source IP | IP5 |

This modified ARP reply fools STB1 to associate (IP5, M3) as an IP/MAC address pair.

In summary, a modified ARP exchange (between a source endpoint and a destination endpoint via a WLAN link between a source STA and a destination STA), in accordance with an embodiment, comprises the following steps:

Upon reception of an ARP request at the destination STA, the destination STA replaces the MAC address of the source endpoint with that of the source STA. This is achieved by looking up this MAC address in the MAC topology table distributed by the AP.

Upon reception of an ARP reply at the source STA, the source STA restores the MAC address of the destination endpoint, by looking up the IP (layer-3) address of the destination endpoint in the IP mapping table. The source STA also replaces the MAC address of the destination endpoint with that of the destination STA, by looking up the MAC address topology table distributed by the AP.

Because of the cloning operation performed by the STAs during the ARP exchange, STB2 will address subsequent DLS/TDLS communication packets to STB1 using (IP4, M2). In other words, the subsequent packets will have the correct IP address of the destination endpoint, but the MAC address of the destination STA instead of the MAC address of the destination endpoint.

Thus, for regular (i.e., non-ARP) received packets over the DLS/TDLS link, the receiving (destination) STA will typically perform deep packet inspection to obtain the destination IP address, and restore the MAC address that corresponds to this IP address using the IP mapping table.

Consider, for example, data transfer from STB1 to STB2. Due to the address replacement during ARP exchange, STB2 will send a subsequent packet to the (IP,MAC) pair (IP5, M3), with a source pair of (IP4,M4). Once the packet traverses the DLS/TDLS link, which uses two-address addressing, the M4 MAC address is lost. Upon receiving the packet, STA2 inspects the packet and finds IP5, which is the correct IP address of the destination endpoint STB2. STA2 then restores the MAC address in the packet to M5 using the IP Mapping Table. STB2 will then receive a packet with a proper (IP5,M5) pair.

When an endpoint that was cloned (as described above) sends a broadcast packet, the source MAC address of the broadcast packet should be cloned, as well, to avoid an IP conflict from occurring (wherein an IP address is associated with more than one MAC address). Continuing the previous example, consider a scenario where the DVR (STB1) sends a broadcast packet with a source MAC address M4, and the packet is received by STB2 after being forwarded by STA2. If the broadcast packet includes the DVR IP address IP4, then an IP conflict occurs since STB2 is aware of the pair (IP4,M2) and not (IP4,M4). To avoid this conflict, STA2 may replace the broadcast source MAC address from M4 to M2.

Figure 2:
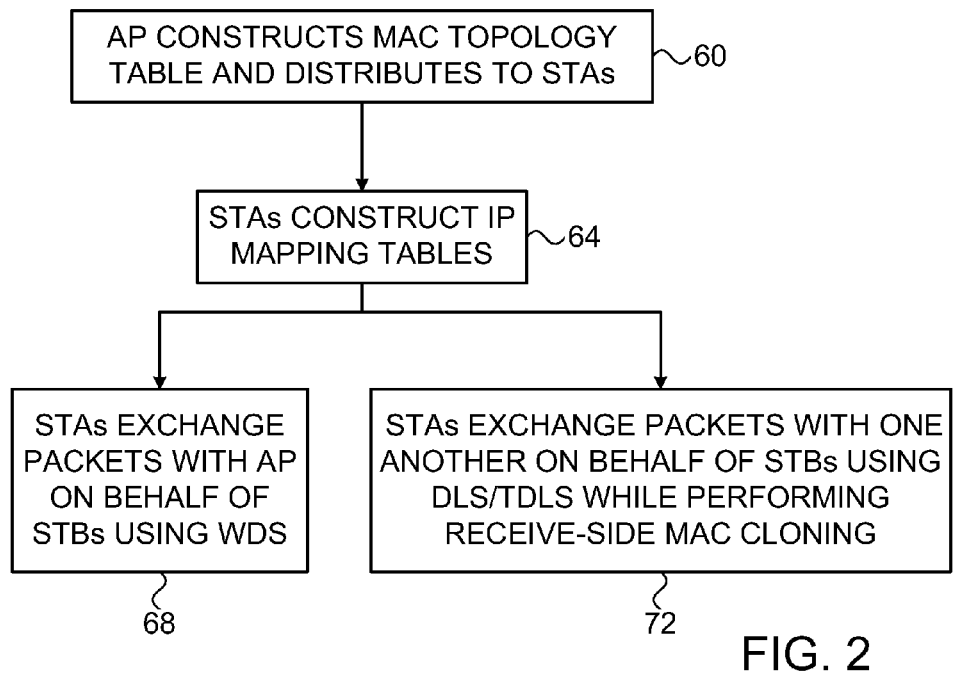
FIG. 2 is a flow chart that schematically illustrates a method for communication in a WLAN-based home networking system, in accordance with an embodiment of the present invention.

FIG. 2 is a flow chart that schematically illustrates a method for communication in system 20, in accordance with an embodiment of the present invention. The method begins with AP 24 constructing a MAC topology table of system 20, and distributing the MAC topology to the STAs, at a topology distribution step 60. Each STA in system 20 learns and constructs an IP mapping table, at an IP table construction step 64.

The STAs exchange packets with the AP on behalf of the STBs using WDS, at a four-address communication step 68. The STAs exchange packets with one another, directly and not via the AP, using DLS or TDLS, at a two-address communication step 72. The STAs carry out step 72 while performing receive-side MAC cloning, as described above.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:

operating a communication system, which comprises a wireless access point (AP) that communicates over a Wireless Local-Area Network (WLAN) with multiple wireless stations (STAs), including at least a first STA that serves a first endpoint and is connected to the first endpoint over a first link that is external to the WLAN, and a second STA that serves a second endpoint and is connected to the second endpoint over a second link that is external to the WLAN;

transferring a communication packet from the first endpoint to the second endpoint by transmitting the packet from the first STA to the second STA, not via the AP, using an addressing scheme that specifies in the packet respective layer-2 addresses of the first and second STAs but not of the first and second endpoints; and in the second STA, resolving the layer-2 address of the second endpoint, inserting the resolved layer-2 address into the packet and forwarding the packet to the second endpoint using the inserted layer-2 address.

2. The method according to claim 1, wherein operating the communication system comprises operating the AP and the STAs in accordance with a Wireless Local Area Network (WLAN) protocol, and wherein the layer-2 addresses comprise Medium Access Control (MAC) addresses.

3. The method according to claim 2, wherein the addressing scheme comprises a Direct Link Setup addressing mode defined in the WLAN protocol.

4. The method according to claim 1, wherein the AP is connected to an AP-side endpoint, and comprising exchanging packets between the AP-side endpoint and a given endpoint that is connected to a given STA, using a four-address addressing scheme that specifies in the packets the layer-2 addresses of the AP-side endpoint, the AP, the given STA and the given endpoint.

5. The method according to claim 4, wherein the four-address addressing scheme comprises a Wireless Distribution System (WDS) addressing mode defined in a Wireless Local Area Network (WLAN) protocol used for communication among the AP and the STAs.

6. The method according to claim 1, wherein resolving the layer-2 address of the second endpoint comprises:
causing the first endpoint to address the packet to a layer-3 address of the second endpoint and to a layer-2 address of the second STA; and
upon receiving the packet in the second STA, replacing the layer-2 address of the second STA with the layer-2 address of the second endpoint.

7. The method according to claim 6, wherein causing the first endpoint to address the packet to the layer-3 address of the second endpoint and to the layer-2 address of the second STA comprises:
receiving in the first STA an address resolution packet from the second endpoint, in which the second endpoint requests the layer-3 address of the first endpoint; and
in the first STA, replacing the layer-2 address of the second endpoint in the received address resolution packet with the layer-2 address of the second STA, and forwarding the address resolution packet to the first endpoint.

8. The method according to claim 7, and comprising, upon receiving in the second STA a response from the first endpoint to the address resolution packet, replacing the layer-2 address of the second STA in the response with the layer-2 address of the second endpoint, and forwarding the response to the second endpoint.

9. The method according to claim 6, and comprising, upon receiving in the second STA a broadcast packet from the first endpoint, replacing a layer-2 source address of the first endpoint in the broadcast packet with the layer-2 source address of the first STA before forwarding the broadcast packet to the second endpoint.

10. The method according to claim 1, wherein resolving the layer-2 address of the second endpoint comprises holding in the second STA layer-2 topology data, which indicates the layer-2 address of the first endpoint and that the first endpoint is connected to the first STA, and resolving the layer-2 address of the second endpoint using the layer-2 topology data.

11. The method according to claim 10, and comprising receiving the topology data from the AP.

12. The method according to claim 1, wherein resolving the layer-2 address of the second endpoint comprises holding in the second STA layer-3 mapping data, which indicates layer-3 addresses and corresponding layer-2 addresses of respective endpoints that are connected to the second STA, and resolving the layer-2 address of the second endpoint using the layer-3 mapping data.

13. The method according to claim 12, and comprising learning the layer-3 mapping data in the second STA by analyzing communication packets sent from the endpoints that are connected to the second STA.

14. A communication system, comprising multiple wireless stations (STAs) that communicate with a wireless Access Point (AP) over a Wireless Local-Area Network (WLAN), the STAs comprising at least a first STA that serves a first endpoint and is connected to the first endpoint over a first link that is external to the WLAN, and a second STA that serves a second endpoint and is connected to a second endpoint over a second link that is external to the WLAN,
wherein the first STA is configured to transfer a communication packet from the first endpoint to the second endpoint by transmitting the packet to the second STA, not via the AP, using an addressing scheme that specifies in the packet respective layer-2 addresses of the first and second STAs but not of the first and second endpoints, and
wherein the second STA is configured to resolve the layer-2 address of the second endpoint, to insert the resolved layer-2 address into the packet and to forward the packet to the second endpoint using the inserted layer-2 address.

15. The system according to claim 14, wherein the AP and the STAs communicate in accordance with a Wireless Local Area Network (WLAN) protocol, and wherein the layer-2 addresses comprise Medium Access Control (MAC) addresses.

16. The system according to claim 15, wherein the addressing scheme comprises a Direct Link Setup addressing mode defined in the WLAN protocol.

17. The system according to claim 14, wherein the AP is connected to an AP-side endpoint, and wherein a given STA is configured to exchange packets between the AP-side endpoint and a given endpoint that is connected to the given STA, using a four-address addressing scheme that specifies in the packets the layer-2 addresses of the AP-side endpoint, the AP, the given STA and the given endpoint.

18. The system according to claim 17, wherein the four-address addressing scheme comprises a Wireless Distribution System (WDS) addressing mode defined in a Wireless Local Area Network (WLAN) protocol used for communication among the AP and the STAs.

19. The system according to claim 14, wherein the first and second STAs are configured to resolve the layer-2 address of the second endpoint by:
causing the first endpoint to address the packet to a layer-3 address of the second endpoint and to a layer-2 address of the second STA; and
upon receiving the packet in the second STA, replacing the layer-2 address of the second STA with the layer-2 address of the second endpoint.

20. The system according to claim 19, wherein the first STA is configured to cause the first endpoint to address the packet to the layer-3 address of the second endpoint and to the layer-2 address of the second STA by:
receiving an address resolution packet from the second endpoint, in which the second endpoint requests the layer-3 address of the first endpoint; and
replacing the layer-2 address of the second endpoint in the received address resolution packet with the layer-2 address of the second STA, and forwarding the address resolution packet to the first endpoint.

21. The system according to claim 20, wherein the second STA is configured, upon receiving a response from the first endpoint to the address resolution packet, to replace the layer-2 address of the second STA in the response with the layer-2 address of the second endpoint, and to forward the response to the second endpoint.

22. The system according to claim 19, wherein the second STA is configured, upon receiving a broadcast packet from the first endpoint, to replace a layer-2 source address of the first endpoint in the broadcast packet with the layer-2 source address of the first STA before forwarding the broadcast packet to the second endpoint.

23. The system according to claim 14, wherein the second STA is configured to hold STA layer-2 topology data, which indicates the layer-2 address of the first endpoint and that the first endpoint is connected to the first STA, and to resolve the layer-2 address of the second endpoint using the layer-2 topology data.

24. The system according to claim 23, wherein the second STA is configured to receive the topology data from the AP.

25. The system according to claim 14, wherein the second STA is configured to hold layer-3 mapping data, which indicates layer-3 addresses and corresponding layer-2 addresses of respective endpoints that are connected to the second STA, and to resolve the layer-2 address of the second endpoint using the layer-3 mapping data.

26. The system according to claim 25, wherein the second STA is configured to learn the layer-3 mapping data by analyzing communication packets sent from the endpoints that are connected to the second STA.

27. The method according to claim 1, wherein resolving the layer-2 address of the second endpoint comprises resolving, by the second STA, that the packet is destined to the second endpoint and not to another endpoint served by the second STA, even though the packet does not specify the layer-2 address of the second endpoint.

28. The system according to claim 14, wherein the second STA is configured to resolve that the packet is destined to the second endpoint and not to another endpoint served by the second STA, even though the packet does not specify the layer-2 address of the second endpoint.

* * * * *